United States Patent
Tamura et al.

(10) Patent No.: US 6,526,344 B2
(45) Date of Patent: Feb. 25, 2003

(54) VEHICLE SPEED CONTROL

(75) Inventors: Minoru Tamura, Yokohama (JP); Hideaki Inoue, Yokohama (JP); Naoki Maruko, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 85 days.

(21) Appl. No.: 09/789,007

(22) Filed: Feb. 21, 2001

(65) Prior Publication Data

US 2001/0027370 A1 Oct. 4, 2001

(30) Foreign Application Priority Data

Feb. 21, 2000 (JP) .......................... 2000-043397

(51) Int. Cl.[7] .......................... G06F 13/00; G05D 1/00
(52) U.S. Cl. .......................... 701/70; 180/170
(58) Field of Search .......................... 701/70, 79, 65, 701/93, 96; 180/170, 174

(56) References Cited

U.S. PATENT DOCUMENTS

| RE31,100 | E | * | 12/1982 | Chouings ............... | 188/328 |
| 5,634,446 | A | | 6/1997 | Rauznitz et al. ......... | 123/322 |
| 6,405,121 | B2 | * | 6/2002 | Tamura et al. ........... | 180/170 |

FOREIGN PATENT DOCUMENTS

| DE | 197 34 567 | 1/1999 |
| EP | 1 081 004 | 3/2001 |
| JP | 7-144588 | 6/1995 |
| JP | 10-114237 | 5/1998 |

OTHER PUBLICATIONS

Protzel et al., "Abstrandregelung Von Fahrzeugen Mit Fuzzy Control", Fuzzy Logic. Theorie and Praxis, Dordmunder Fuzzy–Tage, Jun. 7, 1993, pp. 212–221, XP 000645972.
2002/0026273A1–Tamura et al. Feb. 28, 2002.*

* cited by examiner

Primary Examiner—William A. Cuchlinski, Jr.
Assistant Examiner—Olga Hernandez
(74) Attorney, Agent, or Firm—Foley & Lardner

(57) ABSTRACT

A system and method for reducing speed of a vehicle include determining whether or not there is a need for operator braking action, determining a stand-by braking torque when there is a need for operator braking action, determining a transition braking torque based on the stand-by braking torque and an automatic distance regulation (ADR) braking torque, and applying the transition braking torque to at least one wheel of the vehicle. The transition braking torque may be applied using friction brakes associated with wheels, respectively. The ADR braking torque is represented by an ADR braking request that is generated when an actual distance from the preceding vehicle in front becomes less than a set desired distance. The ADR braking request may be provided at an ADR controller.

21 Claims, 7 Drawing Sheets

FIG.8
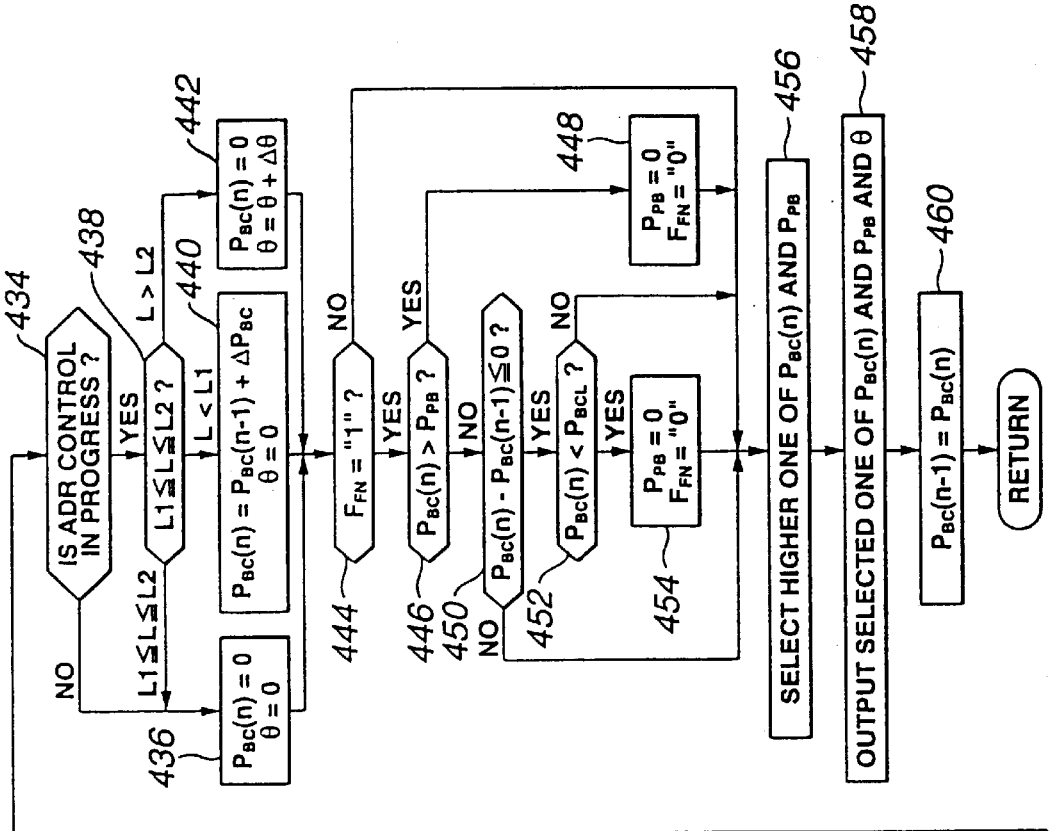
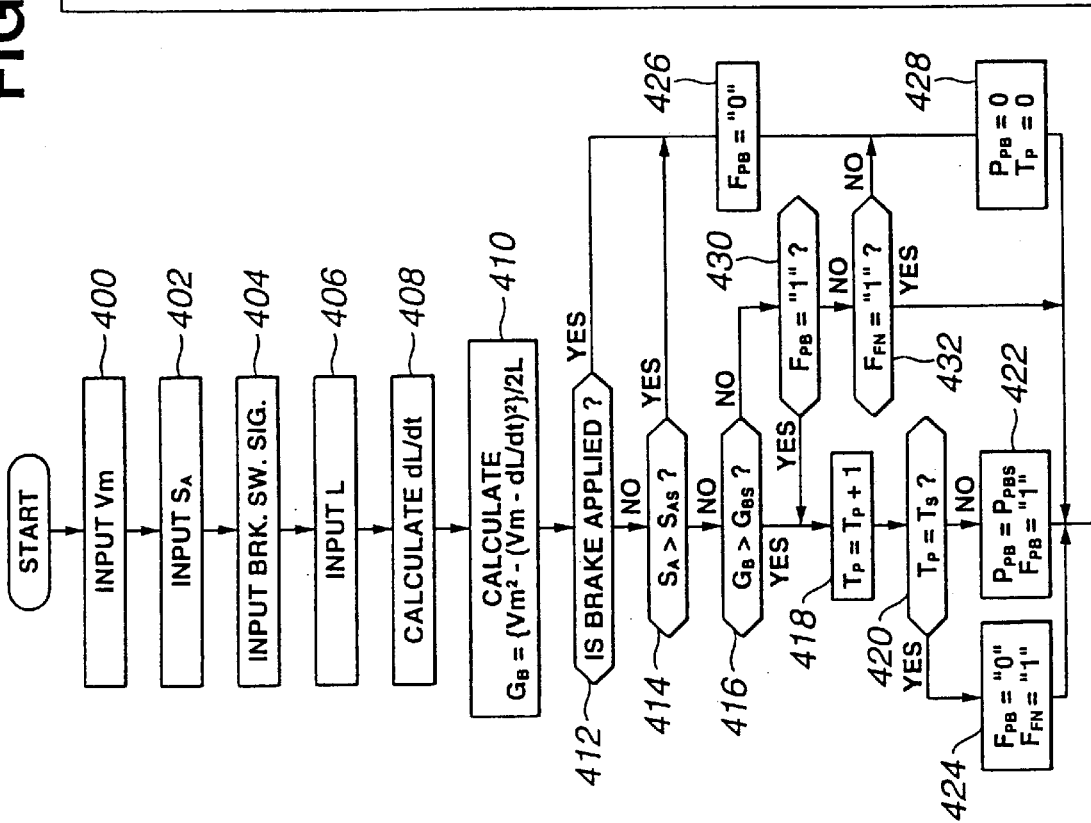

VEHICLE SPEED CONTROL

BACKGROUND OF THE INVENTION

The present invention relates to a system and method for reducing speed of a vehicle.

"Automatic distance regulation" (ADR) systems have been proposed that are intended to detect and carry out a controlled braking action to control the distance of a vehicle from other vehicles and/or stationary objects in the direction of vehicle motion. JP-A 7-144588 discloses a system whereby traveling speed and deceleration of a vehicle in front are determined using a Doppler sensor and a vehicle speed sensor, which are on a vehicle to be controlled, and a desired distance from the vehicle in front is determined in response comparison of the traveling speed of the vehicle in front with a predetermined value of 15 km/h. In this system, a driver is warned and an automatic braking action is initiated if the distance from the vehicle in front becomes less than the desired distance. JP-A 10-114237 discloses a technique to release ADR in response to operator demand for acceleration to pass a vehicle in front without relying on detection of accelerator pedal position. A throttle of an engine is coupled with a throttle actuator and an accelerator pedal. A sensor is provided to detect an actual throttle position. Using a predetermined characteristic curve, a throttle position is estimated from a present position of the throttle actuator. The operator demand for acceleration is detected after comparison of a deviation of the actual throttle position from the estimated throttle position with a threshold value. The deviation is zero when the accelerator is released, but the deviation exceeds the threshold when the accelerator pedal is depressed.

Other systems have been proposed that are intended to initiate braking action before the operator of a vehicle initiates braking action. JP-A 6-24302 discloses a system whereby, when a foot of the operator leaves an accelerator pedal, two micro switches are both closed to energize a solenoid for activating a brake pedal. Energizing the solenoid pulls the brake pedal to partially activate a braking system before the foot of the operator is stepped on the brake pedal.

SUMMARY OF THE INVENTION

Commonly assigned co-pending U.S. patent application Ser. No. 09/640,792 filed on Aug. 18, 2000 discloses a preview brake control system for assisting vehicle operator braking action. For assisting vehicle operator braking action, a detection sub-system on a vehicle to be controlled detects obstacles, which are in or near the direction of motion of the vehicle, and provides corresponding environmental data to a brake controller. In addition, the vehicle has vehicle condition sensors for detecting parameters indicative of the condition or state of motion of the vehicle and transmitting corresponding data to the controller, and vehicle operator demand sensors for detecting parameters indicative of power or brake demand of the operator and transmitting corresponding data to the controller. From the data reported concerning the obstacles, the vehicle condition parameters and the operator demand parameters, the controller ascertains whether or not there is a need for operator braking action. The controller determines a stand-by braking torque in terms of a brake pressure and generates a braking signal for a braking sub-system or braking device to apply the stand-by braking torque to at least one or wheels of the vehicle. As sensors for detection of the obstacles located in or near the direction of motion of the vehicle, conventional radar sensors employing laser, whose application is familiar to those skilled in the art, are used. However, any other types of sensors that permit an adequate preview of the range of motion of the vehicle and which are suitable for service under rough vehicle condition may be used. For full description of the preview brake control system, U.S. patent application Ser. No, 09/640,792, which has its corresponding European Patent Application No. 00307108.1 filed on Aug. 18, 2000, has been hereby incorporated by reference in its entirety.

If the preview braking system is installed in a vehicle having an ADR system, there is little possibility that the preview braking system generates a braking signal for a braking device to apply a stand-by braking toque to at least one wheel of the vehicle while the ADR system in operation. However, there is certain situation where the ADR system generates an ADR braking torque request representing an ADR braking torque to maintain a set desired distance from a preceding vehicle simultaneously with generation of a braking signal by the preview brake control system. This situation appears if the vehicle operator turns on an ADR switch to initiate operation of ADR system when the preview brake control system generates a braking signal for the braking device to apply the determined stand-by braking torque to the at least one wheel. If the ADR braking torque is less than the stand-by braking torque when the ADR system is put into operation, a transition from the stand-by braking torque to the ADR braking torque gives an interruption to deceleration. This transition between braking modes may be noticeable to the operator.

It is an object of the present invention to provide a system and method for reducing speed of a vehicle using transition braking torque to provide smooth and consistent transition from application of braking torque by preview brake control system to application of braking torque by automatic distance regulation (ADR) system.

In carrying out the above object and other objects, advantages, and features of the present invention, a system for reducing speed of a vehicle, comprises a braking device coupled to at least one wheel of the vehicle for applying a braking torque to the at least one wheel in response to a braking signal, and a controller having a control logic for determining whether or not there is a need for operator braking action, determining a stand-by braking torque when there is a need for operator braking action, determining a transition braking torque based on the stand-by braking torque and an automatic distance regulation (ADR) braking torque, and generating a braking signal for the braking device to apply the transition braking torque to at least one wheel of the vehicle. The ADR braking torque is represented by an ADR braking torque request that is generated when an actual distance from a preceding vehicle becomes less than a set desired distance. In one embodiment, the transition braking torque is determined by holding the transition braking torque as high as the stand-by braking torque for a predetermined period of time since the determination was made that there was a need for operator braking action, comparing the stand-by braking toque to the ADR braking torque upon elapse of the predetermined period of time, and holding the transition braking torque as high as the stand-by braking torque over extended period of time after elapse of the predetermined period of time when said ADR braking torque is less than the stand-by braking torque upon elapse of the predetermined period of time.

In carrying out the present invention, a method for reducing speed of a vehicle comprises determining whether or not there is a need for operator braking action, determining a stand-by braking torque when there is a need for operator braking action, determining a transition braking torque based on the stand-by braking torque and an automatic distance regulation (ADR) braking torque, and applying the transition braking torque to at least one wheel of the vehicle.

In carrying out the present invention, a computer readable storage medium is provided, which has stored data representing instructions readable by a computer to reduce speed of a vehicle. The computer readable storage medium comprises instructions for determining whether or not there is a need for operator braking action, instructions for determining a stand-by braking torque when there is a need for operator braking action, instructions for determining a transition braking torque based on the stand-by braking torque and an automatic distance regulation (ADR) braking torque, and instructions for applying the transition braking torque to at least one wheel of the vehicle.

BRIEF DESCRIPTION OF THE DRAWINGS

Further objects and advantages of the invention will be apparent from reading of the following description in conjunction with the accompanying drawings.

FIG. 8 is a flowchart illustrating control logic for one embodiment of the present invention.

BEST MODES FOR CARRYING OUT THE INVENTION

Figure 1:
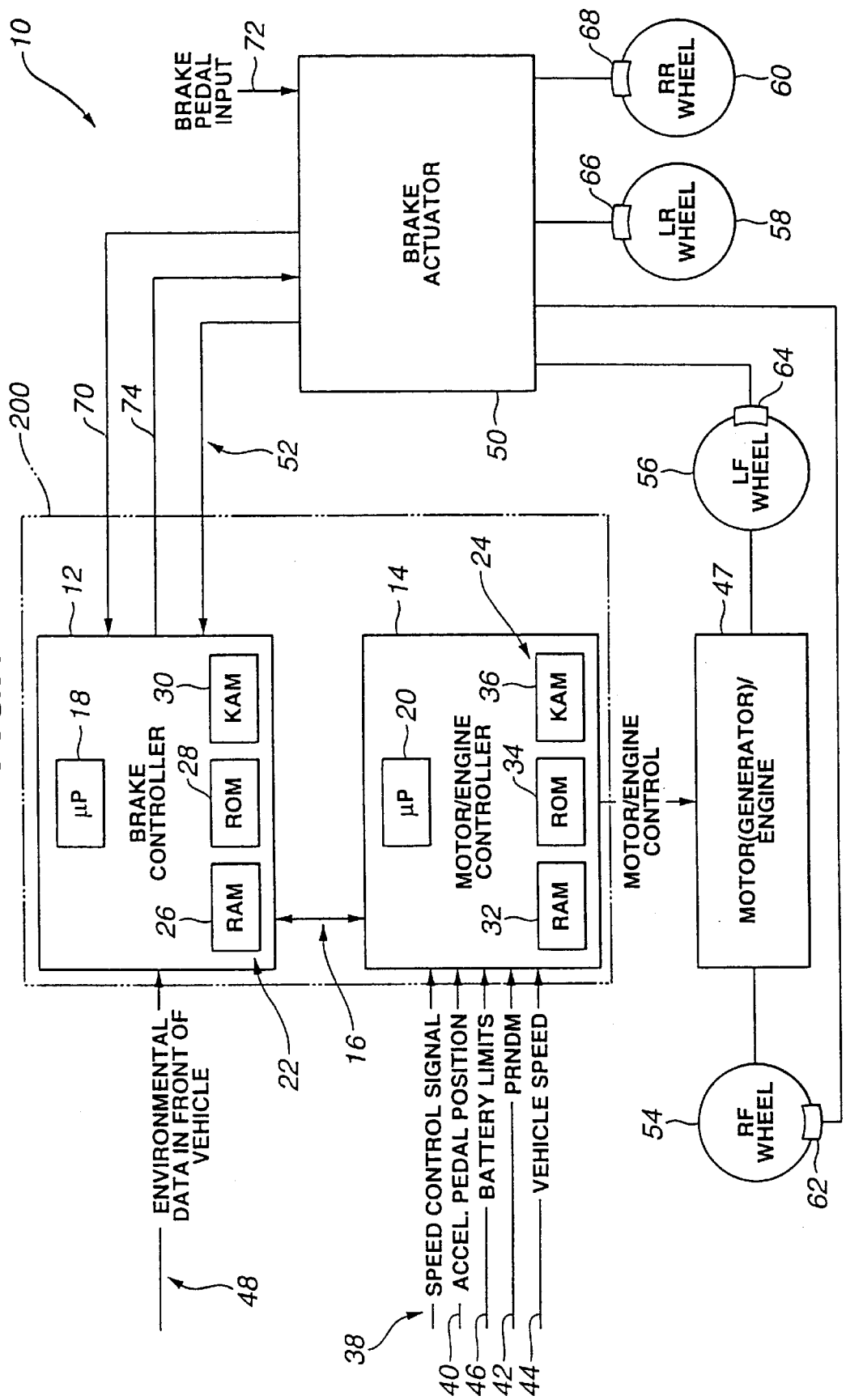
FIG. 1 is a block diagram illustrating a system or method for applying a transition braking torque according to the present invention.

Referring now to FIG. 1, a block diagram illustrating operation of a system or method for reducing speed of a vehicle according to the present invention is shown. System 10 preferably includes a first controller 12, such as a brake controller, in communication with a second controller 14 via an appropriate communication link 16. Second controller 14 is preferably an engine controller. Communication link 16 preferably conforms to an intra-controller bus standard, but is at least capable of exchanging information and commands relative to present operating conditions and control of the vehicle. Depending upon the particular application, second controller 14 may be either an engine controller, such as used for internal combustion engines, or a motor controller, such as used for electric or fuel cell vehicles. Similarly, controller 14 may be used to control a hybrid system which utilizes one or more types of prime movers to power the drive train of a vehicle.

In one preferred embodiment of the present invention, controllers 12 and 14 comprise microprocessor-based controllers with associated microprocessors, represented by reference numerals 18 and 20, respectively. Microprocessors 18 and 20 communicate with associated computer-readable storage media 22 and 24, respectively. As will be appreciable by one of ordinary skill in the art, computer-readable storage media may include various devices for storing data representing instructions executable to control braking, engine, or motor systems. For example, computer-readable storage medium 22 may include a random access memory (RAM) 26, a read-only memory 28, and/or a keep-alive memory (KAM) 30. Computer-readable storage medium 24 may include a random access memory (RAM) 32, a read-only memory (ROM) 34, and/or keep-alive memory (KAM) 36. These functions may be effected through any of a number of known physical devices including EPROM, EEPROM, flash memory, and the like. The present invention is not limited to a particular type of computer-readable storage medium, examples of which are provided for convenience of description only.

Controllers 12 and 14 also include appropriate electronic circuitry, integrated circuits, and the like to effect control of the braking, engine, or motor systems. As such, controllers 12 and 14 are used to effect control logic implemented in terms of software (instructions) and/or hardware components, depending upon the particular application. Details of control logic implemented by controllers 12 and 14 are provided with reference to FIGS. 2, 3, and 8.

Controller 14 receives various signals from sensors to monitor present operating conditions of the vehicle. For example, signals may include cruise control signals, indicated generally by reference numeral, an accelerator pedal position signal 40, a gear selector signal 42, and a vehicle speed signal 44. The cruise control signals represent a cruise control set speed, a set desired distance, and an ON/OFF position of an automatic distance regulation (ADR) switch. Depending upon the particular application, additional signals may be provided, such as battery limit signal 46. Controller 14 may be in direct communication with associated sensors, switches, and other input devices or may receive information relative to sensed parameters via another controller, such as controller 12. Controller 14 receives environmental data in front of the vehicle from controller 12. Controller 14 may be in direct communication with a detection system or unit to receive such environmental data. In operation of automatic distance regulation (ADR) initiated by turning on ADR switch, signals representing the environmental data are processed by controller 14 to determine an actual distance from a preceding vehicle in front for comparison with a set desired distance. Controller 14 compares the actual distance to the set desired distance. If the actual distance is less than the set desired distance, additional engine/motor torque is determined or requested. The additional torque is then applied to the associated wheel or wheels of the vehicle. For internal combustion engine applications, additional torque is typically provided by controlling the quantity of fuel delivered to an engine 47 or controlling the opening of the engine throttle. For electric vehicles, additional torque may be provided by increasing the energy available to a motor/generator 47. Of course, for hybrid vehicles, additional torque may be provided by an internal combustion engine in combination with an associated traction motor. When actual distance becomes less than the set desired distance, a negative or braking torque is required to reduce speed of the vehicle to maintain the set desired distance. Controller 24 attempts to reduce the vehicle speed by reducing the corresponding torque provided by the motor and/or engine 47 of the vehicle. When the engine and/or motor torque has been reduced to its minimum level, controller 24 determines whether additional braking torque is required. If additional braking torque is required, controller 24 determines a braking torque and generates a braking torque request to brake controller 12. If no preceding vehicle is available, controller 14 compares an actual vehicle speed to a set cruise vehicle speed and controls application of positive or negative torque to at least one wheel of the vehicle.

In one embodiment of the present invention, controller 12 is in direct communication with the detection system to receive environmental data, indicated generally by reference numeral 48, in front of the vehicle. Signals 48 are processed by controller 12 to determine an actual distance from obstacle located in the direction of the vehicle.

Brake controller 12 preferably receives inputs from a braking system or brake actuator 50 indicative of present operating conditions of the braking system. For example, controller 12 may receive brake system pressures 52 indicative of a pneumatic or hydraulic pressure for operating one or more braking devices, which may include any device that applies a negative torque to wheels 54, 56, 58, and 60. A braking device includes various types of friction brakes, such as disk brakes 62, 64, 66, and 68 or drum brakes. Controller 12 receives a signal indicative of brake pedal position as represented by reference numeral 70. Alternatively, brake pedal position signal 70 may be provided directly from a sensor associated with a brake pedal or may be provided indirectly through brake actuator 50. For conventional hydraulic or pneumatic baking systems, a brake pedal input 72 provides a fluid coupling between the associated brake pedal and brake actuator 50. This fluid signal may be converted to an appropriate electrical signal to provide the brake pedal position signal 70.

Brake controller 12 processes the signals received from various sensors and messages from controller 14, which include a braking torque request from controller 14. Controller 12 generates braking commands or signals for application of at least one of friction brakes 62, 64, 66, and 68.

In operation, system 10 receives the environmental data from the detection system, vehicle speed signal 44, brake pedal position signal 70, accelerator pedal position signal 40 to determine whether or not there is a need for operator braking action. Brake controller 12 may make this determination. When there is a need for operator braking action, controller 12 determines a stand-by braking torque. Various manners of determining whether or not there is a need for operator braking action are disclosed in the incorporated U.S. patent application Ser. No. 09/640,792 as well as several variations in determining a stand-by braking torque. Assuming now that the ADR switch is turned on to initiate ADR, controller 12 receives an ADR braking torque request from controller 14. This request represents an ADR braking torque. Controller 12 determines a transition braking torque as described in greater detail later, and controls braking devices to apply the transition braking torque to at least one wheel 54, 56, 58, and 60.

Figure 2:
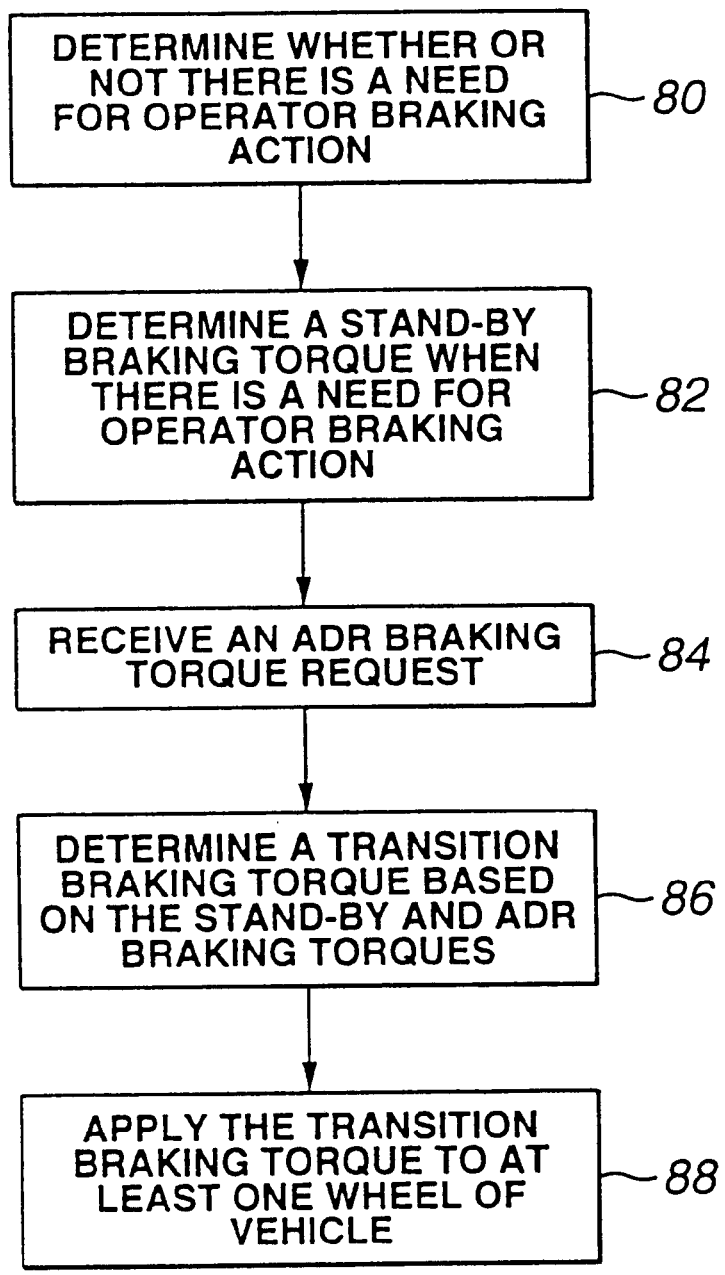
FIG. 2 is a flowchart illustrating control logic for one embodiment of the present invention in a vehicle having friction brakes.
Figure 3:
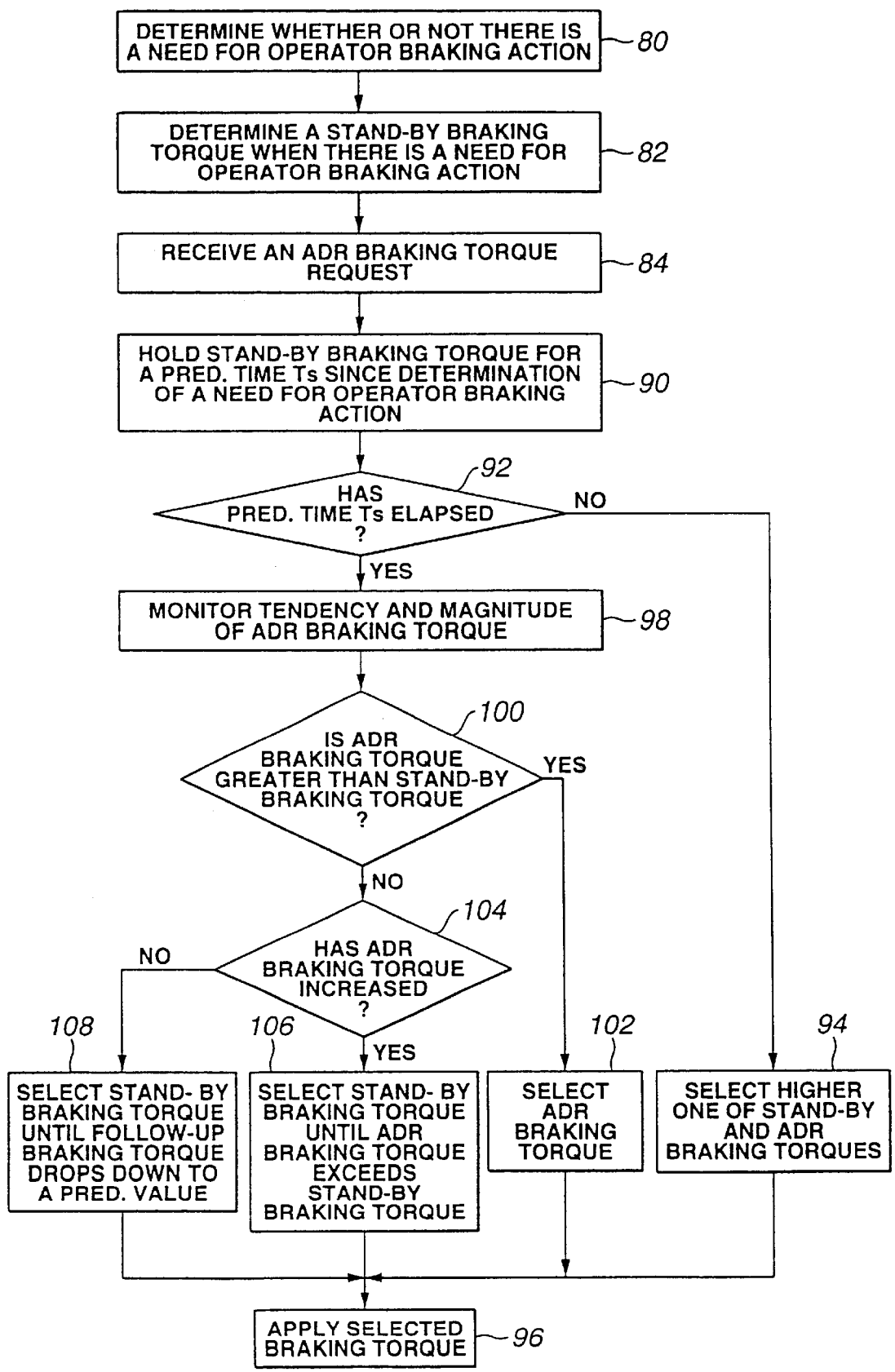
FIG. 3 is a flowchart illustrating control logic for another embodiment of the present invention in a vehicle having friction brakes.

Referring now to FIG. 2, a flowchart illustrating control logic of one embodiment of the present invention is shown. As will be appreciated by one of ordinary skill in the art, the flowcharts illustrated in FIGS. 2, 3, and 8 may represent any of a number of processing strategies which may include event-driven, interrupt-driven, multi-tasking, multi-threading, and the like. As such, various steps or functions illustrated may be performed in the sequence shown, in parallel, or in some cases omitted. Likewise, the order of processing is not necessarily required to achieve the objects, features, and advantages of the present invention, but is provided for ease of illustration and description only. Preferably, the control logic illustrated in FIGS. 2, 3, and 8 is implemented primarily in software, which is executed by one or more microprocessor-based controllers. Of course, the control logic may be implemented in software, hardware, or a combination of software and hardware, depending upon the particular application.

The flowchart of FIG. 2 illustrates control logic for one embodiment of the present invention in a vehicle having a conventional friction braking system that is directly controlled by the vehicle operator via an associated brake pedal. Block 80 represents determination regarding whether or not there is a need for operator braking action. Block 82 represents determination of a stand-by braking torque when there is a need for operator braking action. If, under this condition, the vehicle operator turns on the ADR switch to initiate ADR, there appears an ADR braking torque request representing an ADR braking torque that is required to maintain the set desired distance. This ADR braking torque request is received as represented by block 84. Block 86 represents determination of a transition braking torque based on the stand-by and ADR braking torques. Simplest way of determining the transition braking torque is to compare the stand-by braking torque to ADR braking torque to determine a larger or higher one, and select the higher one as the transition braking torque. As represented by block 88, the transition braking torque is applied to at least one wheel of the vehicle.

As will be appreciated by one of ordinary skill in the art, the control functions or steps illustrated with respect to FIGS. 2, 3, and 8 are preferably repeated at predetermined time intervals or based upon a predetermined event.

Referring now to FIG. 3, a flowchart illustrating another embodiment of the present invention is shown. The flowchart of FIG. 3 is the same as the flowchart of FIG. 2 except the manner of determining a transition braking torque. The same reference numerals are used throughout FIGS. 2 and 3 to denote blocks having the same functions. After block 84, the routine proceeds to block 90. As represented by block 90, stand-by braking torque is held for a predetermined period of time Ts since determination of a need for operator braking action, At interrogation block 92, it is determined whether or not the predetermined period of time Ts has elapsed. If this is not the case, the routine proceeds to block 94. As represented by block 94, a higher one of the stand-by and ADR braking torque is selected. At block 96, the selected braking torque is applied to at least one wheel of the vehicle.

Immediately after elapse of the predetermined period of time Ts, the routine proceeds to block 98. At block 98, the tendency of variations of ADR braking torque and the magnitude thereof are monitored. At interrogation block 100, it is determined whether or not the ADR braking torque is greater than the stand-by braking torque. If this is the case, the logic proceeds to block 102. At block 102, the ADR braking torque is selected. The selected braking torque is applied to at least one wheel of the vehicle as represented by block 96.

If the ADR braking pressure is still less than the stand-by upon or immediately after elapse of the predetermined period of time Ts, the logic proceeds from block 100 to block 104. At block 104, it is determined whether or not ADR braking torque has increased. If this is the case, the stand-by braking torque is selected until the ADR braking torque exceeds the stand-by braking torque as represented by block 106. The selected stand-by braking torque is applied to at least one wheel of the vehicle as represented at block 96.

If the ADR braking torque is not increasing, the interrogation of block 104 results in negative and the logic proceeds to block 108. At block 108, the stand-by braking torque is selected until the ADR braking torque drops down to a predetermined small value, The selected braking torque is applied to at least one wheel of the vehicle as represented by block 96.

As will be appreciated from the flowchart of FIG. 3, a transition braking torque appears upon initiation of ADR under presence of stand-by braking torque and disappears when the ADR braking torque exceeds the stand-by braking torque.

Figure 4:
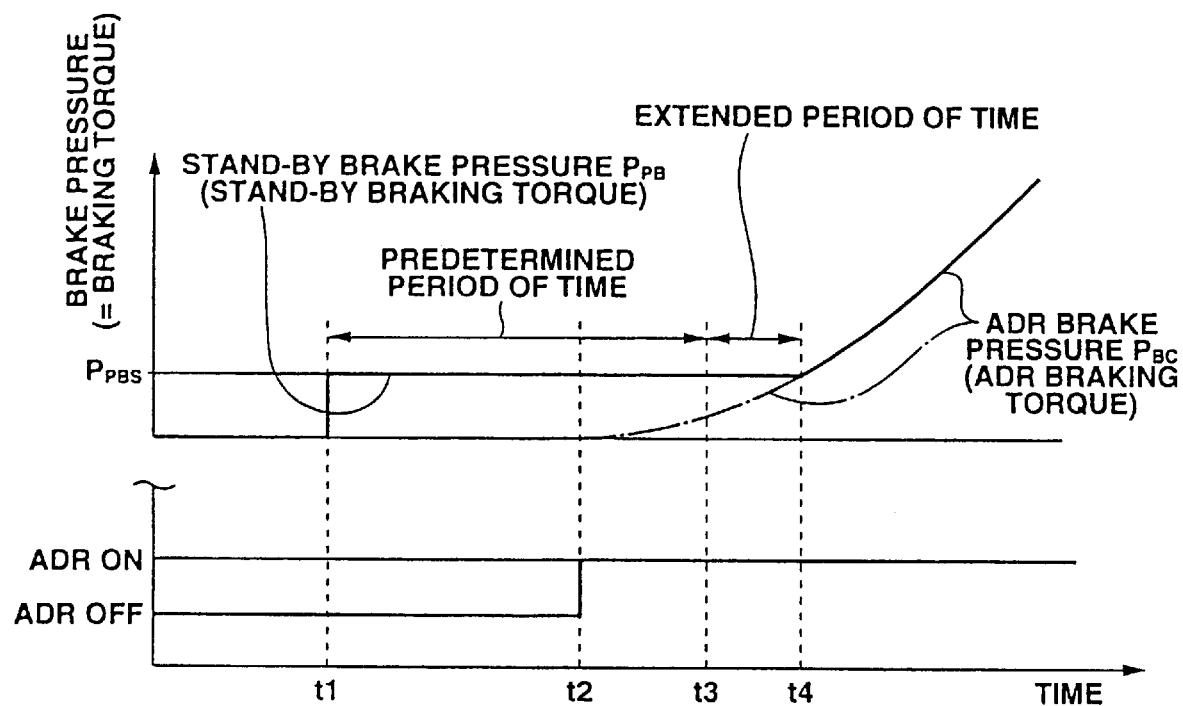
FIG. 4 is a timing diagram illustrating how a transition braking torque bridges a stand-by braking torque and an ADR braking torque in situation where an ADR is turned on to initiate operation of an ADR system when a preview brake control system applies a stand-by braking torque to at least one wheel of a vehicle.

Referring to FIG. 4, a timing diagram illustrates how a transition braking torque bridges the stand-by braking torque and the ADR braking torque in situation where the vehicle operator turns on the ADR switch to initiate operation of ADR system under presence of stand-by braking torque. At moment t1, a need for operator braking action arises and a stand-torque as high as $P_{PBS}$ is applied to at least one wheel of a vehicle. In one embodiment, the stand-by braking torque is kept applied for a predetermined period of time Ts in the neighborhood of 1 second unless the ADR braking torque exceeds the stand-by braking torque. If the ADR braking torque should exceed the stand-by braking torque prior to elapse of the predetermined period of time Ts, the select high rule applies and the ADR braking torque is applied to the at least wheel. In the illustrated case of FIG. 4, the ADR is initiated at moment t2 that falls in the predetermined period of time Ts. Upon or immediately after t2, the ADR braking torque increases gradually as indicated by the one-dot chain line. Until elapse of the predetermined period of time Ts at moment t3, the stand-by braking torque is greater than the ADR braking torque. At moment t3, it is determined whether or not the ADR braking torque is greater than the stand-by braking torque. Since this is not the case, the stand-by braking torque is kept applied to the at least one wheel over extended period of time. At moment t4 when ADR braking torque exceeds the stand-by braking torque, the extended period of time is terminated and the ADR braking torque is applied to the at lest one wheel. As will be appreciated, in the illustrated case, the transition braking torque appears at moment t2 and disappears at moment t4.

Figure 5:
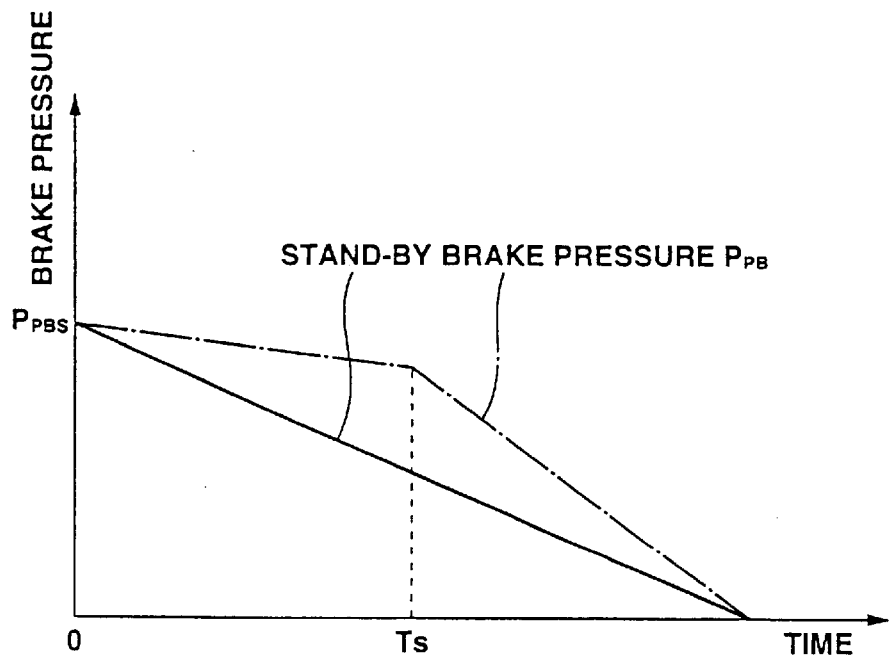
FIG. 5 graphically represents two different manners of gradual reduction of stand-by braking torque after initial determination of a need for operator braking action.

In one embodiment, the stand-by braking torque is invariable over the predetermined period of time Ts and over the extended period of time. FIG. 5 provides two different manners of time dependent reduction of level of stand-by raking torque. As illustrated by the fully drawn line in FIG. 5, stand-by braking torque may be reduced to zero level at a gradual rate over the predetermined period of time Ts and the extended period of time. Alternatively, as indicated by the one-dot chain line, a stand-by braking torque may be reduced at a first rate over the predetermined period of time Ts and at a second greater rate over the extended period of time.

Figure 6:
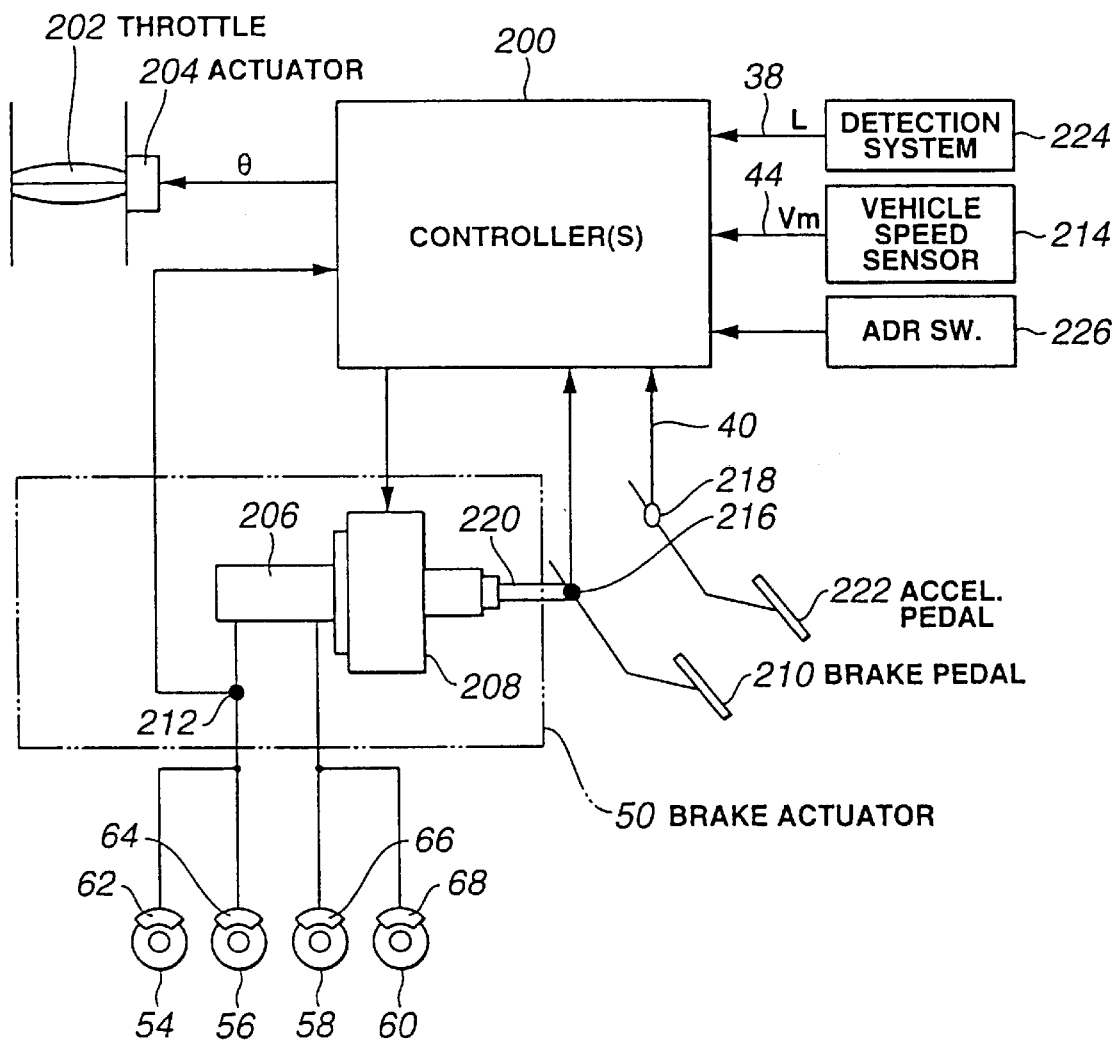
FIG. 6 is a block diagram illustrating a system or method for applying a transition braking torque to at least one wheel of a vehicle that uses a solenoid operated brake booster as a brake actuator.
Figure 7:
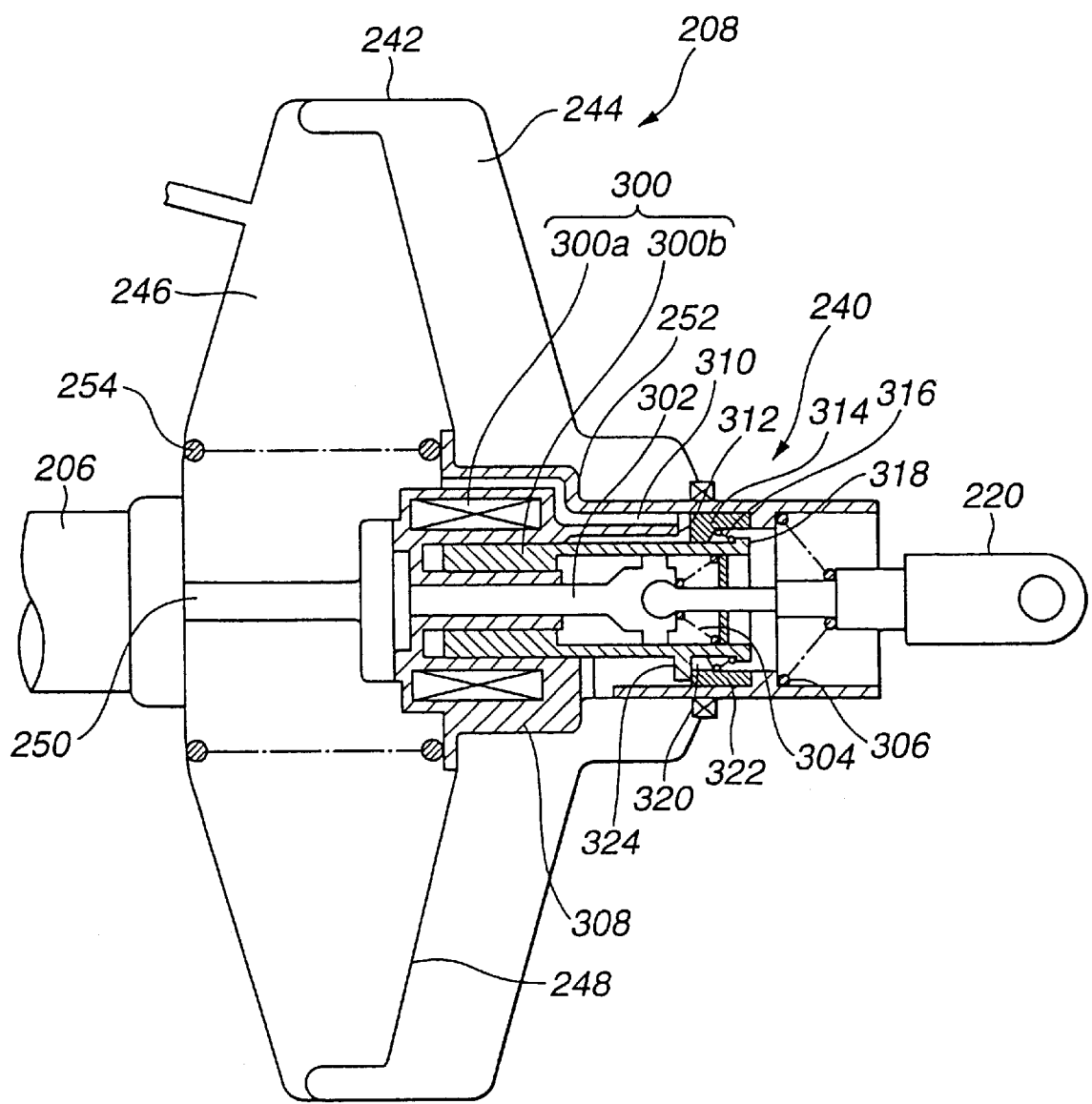
FIG. 7 is a schematic sectional view of the brake booster shown in FIG. 6.

Referring to FIGS. 6, 7, and 8, FIG. 8 is a flowchart, and FIGS. 6 and 7 illustrate hardware.

Referring to FIG. 6, the reference numeral 200 designates controller(s), which correspond to portion in FIG. 1 enclosed by the phantom rectangle. The flowchart of FIG. 2 illustrates control logic in a vehicle having an internal combustion engine with a throttle 202 whose opening angle is adjusted by an actuator 204. The vehicle has a conventional braking system 50 including a master brake cylinder 206 with a brake booster 208 and a brake pedal 210. A brake pressure sensor 212 is provided to detect brake pressure delivered from master cylinder 206 to friction brakes 62 and 64 for front wheels 54 and 56.

Vehicle speed sensor 214 is provided to detect speed Vm of vehicle. A brake switch 216 and an accelerator stroke sensor 218 are provided to sense operator demand. Brake switch 216 is operatively connected to brake pedal 210. Specifically, brake switch 216 is connected to a rod-shaped actuator 220 of brake booster 208. The setting is such that brake switch 216 has an off-state when brake pedal 210 is released and has an on-state when brake pedal 210 is depressed. Accelerator stroke sensor 28 detects instantaneous stroke of an accelerator pedal 222 and generates an accelerator stroke or pedal position signal $S_A$. A detection system 224 includes a distance detection sensor for detecting a distance L from an obstacle, including a preceding vehicle, in front and generates a distance signal. Detection system 224 includes a laser radar or a millimeter wave radar. An ADR switch 226 is provided. The vehicle operator manipulates ADR switch 226 to initiate automatic distance regulation (ADR).

Referring to FIG. 7, brake booster 208 includes an electro-magnetically operable control valve arrangement 240. Controller 200 provides braking command or signal to control valve arrangement 240 for adjustment of brake pressure to desired stand-by pressure. Brake booster 208 comprises an essentially rotation symmetrical housing 242, in which a rear chamber 244 and a front chamber 246 are arranged and separated from each other by a movable wall 248. Control valve arrangement 240 is coupled with movable wall 248 for a common relative movement with respect to housing 242. The front end of rod-shaped actuation member 220, which is coupled with brake pedal 210, acts on control valve arrangement 240.

Within brake booster 208, a power output member 250 is arranged which bears against control valve arrangement 240. Power output member 250 is provided for activation of master brake cylinder 206.

Control valve arrangement 240 comprises an essentially tubular valve housing 252. The front end of valve housing 252 is coupled to movable wall 248. A return spring 254 arranged within brake booster 208 resiliently biases the control valve arrangement 240 rearwardly. Within valve housing 252, an electromagnetic actuator 300 is arranged which includes a solenoid coil 300a and a plunger 300b. Arranged within plunger 300b is an operating rod 302. The front end of operating rod 302 bears against power output member 250. A return spring 304 located within plunger 300b has one end bearing against a retainer (no numeral) fixedly connected to plunger 300b and opposite end bearing against the rear end of operating rod 302. The front ball end of rod-shaped actuator 220 is fixedly inserted into socket recessed inwardly from the rear end of operating rod 302. A return spring 306 located within valve housing 308 has one end bearing against a shoulder of valve housing 308 and opposite end bearing against a shoulder of rod-shaped actuator 220.

Valve housing 308 is formed with a passage 310 through which fluid communication between rear and front chambers 244 and 246 is established. The front end of passage 310 is always open to front chamber 246, while the rear end of passage 310 is located within a valve seat 312. Valve seat 312 is located within an annular space defined between plunger 300b and valve housing 308 and faces a valve member 314 that forms an upper portion of a slide. The slide is located between plunger 300b and valve housing 308. A return spring 316 has one end bearing against an integral abutment 318 of plunger 300b and opposite end bearing against the slide. An air admission port 320 is formed through a lower portion of the slide, This lower portion of the slide serves as a valve seat 322. Port 320 is provided to admit ambient air into rear chamber 244. Valve seat 322 formed with port 320 faces a valve member 324 integral with plunger 300b. Valve seat 312 and valve member 314 cooperate with each other to form an interruption or vacuum valve. Valve seat 322 and valve member 324 cooperate with each other to form an ambient air admission valve.

In the rest position shown in FIG. 7 with the vacuum source disconnected, atmospheric pressure prevails in both chambers 244 and 246. With the vacuum source connected, i.e., with the engine running, a vacuum is built up in front chamber 246 so that movable wall 248 together with the control valve arrangement 240 is slightly displaced in a forward direction. Accordingly, a new pressure balance is achieved between two chambers 244 and 246. From this position, a lost travel free activation of the brake booster 208 is ensured.

Under a normal brake actuation by the vehicle operator, the brake booster 208 operates in a usual manner by interrupting the connection between two chambers 244 and 246 via the interruption valve (312, 314) and admitting ambient air into rear chamber 244 via the ambient air admission valve (324, 322).

Electromagnetic actuator 300 can actuate control valve arrangement 240. For this purpose, current through solenoid 300a is regulated in response to braking command furnished by controller 200. This command causes a displacement of control valve arrangement 240 so that ambient air can flow into rear chamber 244.

The flowchart of FIG. 8 illustrates control logic for another embodiment of the present invention. In the flowchart of FIG. 8, blocks 400 to 432 represent determination whether or not there is a need for operator braking action, and determination of stand-by brake pressure $P_{PB}$ required for so-called "preview" brake control.

Blocks 400, 402, 404, and 406 represent input of vehicle speed Vm, accelerator pedal stroke $S_A$, brake switch output, and actual distance L from obstacle or preceding vehicle in front, respectively.

Time derivative dL/dt of actual distance L is calculated as represented by block 408.

At block 410, using vehicle speed Vm and time derivative of distance dL/dt, a target deceleration $G_B$ is determined by calculating the equation as follows:

$$G_B = \{Vm^2 - (Vm - dL/dt)^2\}/2L.$$

Block 414 represents determination whether or not the brake is applied. This determination is made from the output of brake switch 216. The output signal of brake switch 216 assumes an OFF-level when brake pedal 210 is released, and ON-level when it is depressed. If the interrogation results in negative, the logic proceeds to block 414. At block 414, it is determined whether or not accelerator pedal position $S_A$ is greater than a predetermined accelerator pedal position value $S_{AS}$, which value corresponds to a position at which the vehicle starts acceleration upon depressing the accelerator pedal 222. If $S_A$ is less than or equal to $S_{AS}$, the logic proceeds to block 416.

At block 416, it is determined whether or not target deceleration $G_{BS}$ in the neighborhood of 6.0 m/sec² has exceeded a predetermined deceleration value $G_{BS}$. If $G_B$ has exceeded $G_{BS}$, it is determined that there is a need for operator braking action and the logic proceeds to block 418. At block 418, count $T_P$ of timer is increased by one "1". At the next block 420, it is determined whether or not the timer count $T_P$ has reached a predetermined value $T_S$, If $T_P$ is less than $T_S$, the logic proceeds to block 422. At block 422, a stand-by brake pressure $P_{PB}$ is determined and a stand-by brake pressure flag $F_{PB}$ is set equal to "1". The stand-by brake pressure $P_{PB}$ is given a predetermined low pressure value $P_{PBS}$ as represented by block 422. The setting is such that, with stand-by brake pressure $P_{PB}$ as high as $P_{PBS}$, a stand-by braking torque is applied to wheels of vehicle, which is sufficiently small and provides the least interference to the drive comfort. The logic enters processing required for carrying out ADR, which begins with block 434 in the illustrated example. If, at block 420, timer count $T_P$ has reached $T_S$, the logic proceeds to block 424. At block 420, flag $F_{PB}$ is reset equal to "0" and an extension flag $F_{FN}$ is set equal to "1" before proceeding to block 434.

If, at block 412, it is determined that the brake pedal 210 is depressed, it is determined that there is no need for stand-by brake pressure because the vehicle operator has depressed brake pedal intentionally to apply braking torque to vehicle wheels. Under this condition, the logic proceeds to block 426 and then to block 428. At block 426, flag $F_{PB}$ is reset. At block 428, stand-by brake pressure $P_{PB}$ is set equal to 0 (zero), and timer count $T_P$ is cleared to become 0 (zero). After block 428, the logic proceeds to block 434.

If, at block 416, it is determined that $G_B$ is less than or equal to $G_{BS}$, it is determined that there is no need for operator braking action, and the logic proceeds to block 430. At block 430, it is determined whether or not flag $F_{PB}$ is set equal to "1". If $F_{PB}$="1", the logic proceeds to block 418. If $F_{PB}$="0", the logic proceeds to block 432. At block 432, it is determined whether or not extension flag $F_{FN}$ is set equal "1". If $F_{FN}$="1", the logic proceeds to block 434. If $F_{FN}$="0", the logic proceeds to block 428.

ADR is initiated by turning on ADR switch 226. At block 434, it is determined whether or not ADR switch 226 assumes its ON state. If it assumes OFF state, it is determined that the vehicle operator has no intention to initiate ADR, and the logic proceeds to block 436. At block 436, a present ADR brake pressure $P_{BC}(n)$ is set equal to 0 (zero) and a throttle command θ is set equal to 0 (zero). If, at block 434, ADR switch 226 assumes ON state, the logic proceeds to block 438.

At block 438, it is determined whether actual distance L is less than L1 (L<L1), L is not less than L1 and not greater than L2 (L1≦L≦L2), or L is greater than L2. If L1≦L≦L2, it is determined that actual distance L from a vehicle in front falls in the neighborhood of a set desired distance, and the logic proceeds to block 436. If L<L1, it is determined that actual distance from the vehicle in front is too short and the logic proceeds to block 440. At block 440, the previous ADR brake pressure $P_{BC}$ is increased by a predetermined value $\Delta P_{BC}$ to give the result as present ADR brake pressure $P_{BC}(n)$, and throttle command θ is set equal to 0 (zero). If L>L2, it is determined that actual distance L from the vehicle in front is too long, and the logic proceeds to block 442. At block 442, present ADR brake pressure $P_{BC}(n)$ is set equal to 0 (zero), and throttle command θ is increased by a predetermined value Δθ. After block 436, 440 or 442, the logic proceeds to block 444.

At block 444, it is determined whether or not extension flag $F_{FN}$ is set equal to "1". If $F_{FN}$="0", the logic proceeds to block 456. If $F_{FN}$="1", the logic proceeds to block 446.

At block 446, it is determined whether or not the present ADR brake pressure $P_{BC}(n)$ exceeds the stand-by brake pressure $P_{PB}$. If $P_{BC}(n)>P_{PB}$, the logic proceeds to block 448. At block 448, stand-by brake pressure $P_{PB}$ is set equal to 0 (zero), and extension flag $F_{FN}$ is reset equal to "0". The logic proceeds next to block 456. If ADR brake pressure $P_{BC}(n)$ is less or equal to than $P_{PB}$ ($P_{BC}(n) \leq P_{PB}$), the logic proceeds to block 450.

At block 450, it is determined whether or not ADR brake pressure tends to decrease. Specifically, this determination is made if a subtraction of the previous ADR brake pressure $P_{BC}(n-1)$ from the present ADR brake pressure $P_{BC}(n)$ is negative or equal to zero. If, at block 450, $P_{BC}(n)-P_{BC}(n-1)>0$, it is determined that ADR brake pressure tends to increase, and the logic proceeds to block 456. If $P_{BC}(n)-P_{BC}(n-1) \leq 0$, it is determined that ADR brake pressure tends to decrease or remain invariable, and the logic proceeds to block 452.

At step 452, it is determined whether or not present ADR brake pressure $P_{BC}(n)$ is less than a predetermined value $P_{BCL}$ near zero. If $P_{BC}(n) \geq P_{BCL}$, the logic proceeds to block 456. If $P_{BC}(n) < P_{BCL}$, the logic proceeds to block 454. At block 454, stand-by brake pressure $P_{PB}$ is set equal to 0 (zero), and the logic proceeds to step 456.

At block 456, present ADR brake pressure $P_{BC}(n)$ is compared to stand-by brake pressure $P_{PB}$ to determine which is higher or greater and the higher one of the brake pressures $P_{BC}(n)$ and $P_{PB}$ is selected. At block 458, a braking command corresponding to the selected one of brake pressures $P_{BC}(n)$ and $P_{PB}$ and throttle command θ are generated to brake actuator 50 and to the throttle actuator 204, respectively. At the next block 460, present ADR brake pressure $P_{PC}(n)$ is stored as the previous ADR brake pressure $P_{BC}(n-1)$.

With continuing reference to FIG. 8, it is now assumed that extension flag $F_{FN}$ is reset and thus equal to "0", and ADR switch 226 remains OFF state during running of the vehicle with accelerator pedal 222 depressed and brake pedal 210 released. Under this operating condition, the logic flows along blocks 412, 414, and 426. At block 426, stand-by brake pressure flag $F_{PB}$ is reset. At the next block 428, stand-by brake pressure $P_B$ becomes zero and timer count $T_P$ is cleared. The logic flows along blocks 434 and 436 since ADR switch 226 has OFF state. At block 436, ADR brake pressure $P_{BC}(n)$ becomes zero and throttle command θ becomes zero, terminating torque due to ADR.

Next, the logic flows along blocks 444 and 456 since extension flag $F_{FN}$ is reset. Since both $P_{PB}$ and $P_{BC}$ are equal to zero, selecting higher one, at block 456, results in brake pressure command representing zero brake pressure. Under this condition, no current passes through the solenoid coil 300a, and brake pressure is zero, applying no braking torque to the vehicle wheels. Running state without any braking torque is maintained.

In this running state, approaching a preceding vehicle in front, the operator reduces the amount of depression of the accelerator pedal to a position where $S_A$ becomes less than $S_{AS}$. Then, the logic begins to flow from block 414 to block 416. Assuming now that derivative of vehicle-to-vehicle distance dL/dt remains small so that target deceleration $G_B$ calculated at block 410 is in the neighborhood of zero, the logic begins to flow from block 416 to block 430. Since flag $F_{PB}$ is reset, the logic flows from block 430 to block 432. As flag $F_{FN}$ is reset, the logic flow from block 432 to block 428.

At block 428, stand-by brake pressure $P_{PB}$ becomes zero and time count $T_P$ is cleared. Running state without any braking torque continues.

If the vehicle approaches a preceding vehicle too quickly and the distance L becomes short, the target deceleration $G_B$ exceeds $G_{BS}$. Determining that there is a need for operator braking action, the logic flows from block 416 to block 418. At block 418, timer count $T_P$ is increased by 1 (one). The logic flows to the next block 420, Since time count $T_P$ is still less than $T_S$, the logic flows from block 420 to block 422. At block 422, $P_{PBS}$ is set as $P_{PB}$, and flag $F_{PB}$ is set.

Assuming now that ADR switch 226 is in OFF state so that ADR brake pressure $P_{BC}$ remains 0 (zero), what is selected at block 456 is $P_{PBS}$ that has been set as $P_{PB}$, and current corresponding to $P_{PBS}$ is allowed to pass through solenoid coil 300a of brake booster 208. This closes interruption valve (312, 314) and opens air admission valve (324, 322), allowing admission of air into rear chamber 244, moving tubular valve housing 252 and power output member 250 to the left by a limited amount, causing master brake cylinder 206 to produce a brake pressure represented by $P_{PBS}$. This brake pressure causes friction brakes 62–68 to apply stand-by braking torque to the vehicle wheels. The magnitude of stand-by braking torque may differ as long as it is not objectionable to the vehicle operator.

In this "preview" braking state, if the vehicle operator depresses brake pedal 210, the power output member 250 moves further to the left, causing admission of increased amount of air into rear chamber 244. Difference, in pressure, between rear and front chambers 244 and 246 increases, causing amplification of force applied to master brake cylinder 206, producing amplified brake pressure corresponding to operator effort to depressed brake pedal 210. Thus, friction brakes can apply appropriate braking torque to vehicle wheels to meet expectation by operator.

Let us now consider the case where, in the "preview" braking state, the vehicle operator is reluctant to depress brake pedal 210 after releasing accelerator pedal 222 because the preceding vehicle begins to accelerate or move off from the standstill. In this case, the logic flows to block 418 from block 416 or 430 regardless of whether $G_B$ is greater than $G_{BS}$. At block 418, timer count $T_P$ is increased by 1 (one). Until timer count $T_P$ reaches $T_S$, the logic keeps on flowing to block 422 where $P_{PBS}$ is set as $P_{PB}$ and flag $F_{PB}$ is set, maintaining "preview" braking state.

Immediately after timer count $T_P$ has reached $T_S$, the logic flows from block 420 to block 424. At block 424, flag $F_{PB}$ is reset and extension flag $F_{FN}$ is set. Since ADR switch 226 is in OFF state, the logic flows from block 434 to block 436. At block 436, $P_{BC}(n)$ becomes 0 (zero) and throttle command θ becomes 0 (zero). The logic next flows to block 444, Since flag $F_{FN}$ has been set, the logic flow from block 444 to block 446. Since $P_{PBS}$ is set as $P_{PB}$, the logic flows from block 446 to block 450. Since present ADR brake pressure $P_{BC}(n)$ and previous ADR brake pressure $P_{BC}(n-1)$ are both equal to zero, respectively, the logic flow from block 450 to block 452. Since present ADR brake pressure $P_{BC}(n)$ is less than $P_{BCL}$, the logic flow from block 452 to block 454, At block 454, $P_{PB}$ becomes 0 (zero) and extension flag $F_{FN}$ is rest.

At the next block 456, what is selected is zero brake pressure. Thus, current passing through solenoid coil 300a is interrupted, terminating production of stand-by brake pressure. Since the braking torque caused by stand-by brake pressure is the least objectionable to vehicle operator, running state without any braking torque is reinstated without any shocks upon disappearance of such braking torque.

Referring to FIG. 4, at moment t1, target deceleration $G_B$ exceeds $G_{BS}$, initiating "preview" brake control. After moment t1, accelerator pedal 222 and brake pedal 210 are left released. In FIG. 4, the predetermined period of time $T_S$ elapses at moment t3. At moment t2 prior to moment t3, ADR switch 226 is turned ON to initiate ADR processing beginning with block 434. The logic flows from block 434 to block 438.

If distance L from a preceding vehicle is less than L1, the logic flows from block 438 to block 440. At block 440, the present ADR brake pressure $P_{BC}(n)$ is given by adding $\Delta P_{PB}$ to previous ADR brake pressure $P_{BC}(n-1)=0$ (zero). Thus, ADR brake pressure increases as indicated by one-dot chain line in FIG. 4.

In this state, since timer count $T_P$ is less than $T_S$, extension flag $F_{FN}$ is reset. Thus, the logic flows from block 444 to block 456. At block 456, what is selected is stand-by brake pressure $P_{PB}$ because $P_{PB}$ is greater than ADR brake pressure $P_{BC}(n)$.

Subsequently, ADR brake pressure $P_{BC}(n)$ continues to increase and remain below stand-by brake pressure $P_{PB}$. At moment t3 when timer count $T_P$ reaches $T_S$, the logic flows from block 420 to block 424. At block 424, flag $F_{PB}$ is reset and flag $F_{FN}$ is set.

Since flag $F_{FN}$ has been set, the logic flows from block 444 to block 446. In this state, $P_{BC}(n)$ is less than $P_{PB}$ so that the logic flows from block 446 to block 450. Since ADR brake pressure $P_{BC}(n)$ continues its increasing tendency, the logic jumps from block 450 to block 456. At block 456, stand-by brake pressure $P_{PB}$ is selected.

The distance L from the preceding vehicle increases gradually so that $G_B$ becomes less than $G_{BS}$. The logic flows from block 416 to block 430. Since flag $F_{PB}$ is reset, the logic flows from block 430 to block 432. Since flag $F_{FN}$ is set, the logic flows from 432 to block 434, leaving $P_{PBS}$ set as $P_{PB}$. Since $P_{BC}(n)$ continues to increase and remain below $P_{PB}$, the logic flows from block 450 to block 456. At block 456, $P_{PB}$ is selected.

At moment t4 when $P_{BC}(n)$ exceeds $P_{PB}$, the logic flows from block 446 to block 448. At block 448, $P_{PB}$ becomes 0 (zero) and flag $F_{FN}$ is reset. The logic next flows to block 456. At block 456, $P_{BC}(n)$ is selected. As a result, the friction brakes apply braking torque corresponding to brake pressure $P_{BC}(n)$ to the associated wheels.

At the subsequent cycle, the logic flows from block 416 to block 432 via block 430. Since flag $F_{FN}$ is reset, the logic flows from block 432 to block 428. At block 428, stand-by brake pressure $P_{PB}$ becomes 0 (zero) and timer count $T_P$ is cleared. "Preview" brake control is terminated and brake control by ADR continues.

In the embodiment, it is now appreciated that the system keeps on selecting the stand-by brake pressure $P_{PB}(=P_{PBS})$ even after the operator has initiated ADR by turning on ADR switch 226 at moment t2 as long as the ADR brake pressure $P_{BC}$ tends to increase and remains less than the stand-by brake pressure $P_{PB}$ until elapse of the predetermined period of time $T_S$ at moment t3. If, at moment t3, the ADR brake pressure $P_{BC}(n)$ remains less than the stand-by brake pressure $P_{PB}$, the system keeps on selecting the stand-by brake pressure $P_{PB}$ over extended period of time that is terminated when the ADR brake pressure $P_{BC}(n)$ exceeds the stand-by brake pressure $P_{PB}$. The system selects the ADR brake pressure $P_{BC}(n)$ when the ADR brake pressure $P_{BC}(n)$ exceeds the stand-by brake pressure $P_{PB}$ at moment t4. In the embodiment, the stand-by brake pressure $P_{PB}$ that is kept selected from moment t2 to moment t4 prevents an undesired drop in braking torque during transition from "preview" brake control to brake control for ADR.

In the embodiment, it is also appreciated that the system keeps on selecting the stand-by brake pressure $P_{PB}(=P_{PBS})$ even after the operator has initiated ADR by turning on ADR switch 226 as long as the ADR brake pressure $P_{BC}$ tends to increase and remains less than the stand-by brake pressure $P_{PB}$, but the system selects the ADR brake pressure $P_{BC}(n)$ when $P_{BC}(n)$ exceeds the stand-by brake pressure $P_{PB}$ prior to elapse of the predetermined period of time $T_S$. This can be confirmed from the fact that logic flows from block 444 to block 456 because $F_{FN}$ and the system selects $P_{BC}(n)$ at block 456.

In the embodiment, the system terminates application of stand-by brake pressure $P_{PB}$ upon elapse of the predetermined period of time $T_S$ if the ADR was initiated and then the distance L from a preceding vehicle exceeded L1 within a time range from the initiation of application of stand-by brake pressure $P_{PB}$ to elapse of the predetermined period of time $T_S$. This can be confirmed from the fact that, upon or immediately after elapse of the predetermined period of time $T_S$, the logic flows along blocks 430, 432, 434, 438, 436 (or 442), 444, 446, 450, 452, and 454, and, in the next cycle, the logic flows along 430, 432, and 428. At block 428, the stand-by brake pressure $P_{PB}$ becomes 0 (zero) and timer count $T_P$ is cleared.

If the distance L exceeds L1 after elapse of the predetermined period of time $T_S$, the system terminates application of stand-by brake pressure $P_{PB}$. It is appreciated that the distance L exceeds L1 if the preceding vehicle in front shifts to another lane or accelerates.

In the embodiment, the predetermined value of $P_{PBS}$ is set as the stand-by brake pressure $P_{PB}$. Alternatively, varying values may be set as stand-by brake pressure $P_{PB}$. Preferably, stand-by brake pressure $P_{PB}$ is determined as a function of vehicle speed Vm at the initiation of "preview" brake control. The greater the vehicle speed Vm, the greater the stand-by brake pressure $P_{PB}$ is. If desired, the stand-by brake pressure $P_{PB}$ may be determined in response to speed at which the accelerator pedal is released, road friction coefficient, and/or transmission shift position.

In the embodiment, the system keeps the stand-by brake pressure $P_{PB}$ invariable over the predetermined period of time $T_S$. If desired, the system may vary the stand-by brake pressure $P_{PB}$ in a manner as illustrated by the fully drawn line in FIG. 5 or by the one-dot chain line in FIG. 5. Alternatively, the system may vary the stand-by brake pressure $P_{PB}$ at continuously changing rates.

In the embodiment, brake switch 216 is provided to detect operator effort to manipulate brake pedal 210. If desired, stroke of the brake pedal may be relied on to detect the initiation of operator braking effort.

In the embodiment, description has been made with reference to a preceding vehicle in front. The present invention is applicable to the situation where the detection system 224 detects obstacles in the direction of the vehicle.

In the embodiment, relative speed between vehicles is determined by calculating the derivative of distance L with respect to time. If a detection system is capable of detecting the relative speed, the detected relative speed may be used.

In the embodiment, the brake booster 208 employing solenoid coil 300a is used to generate brake pressure corresponding to $P_{PB}$ or $P_{BC}(n)$, Brake actuator is not limited to such brake booster and may take any other form in implementing the present invention. For example, brake pressure corresponding to $P_{PB}$ or $P_{BC}(n)$ may be produced by regulating a system hydraulic pressure discharged by a pump.

In the embodiment, the hydraulic braking system communicating with friction brakes is used as braking devices.

If desired, a braking device may be implemented by a traction motor/generator, represented generally by reference numeral 47 in FIG. 1, which applies a negative, or retarding torque when used as a braking device. The braking device may be directly coupled to one or more wheels 54–60 via an appropriate mechanical or hydraulic linkage.

In the embodiment, the automatic distance regulation (ADR) is carried out to bring the distance L into a target window expressed by L1≦L≦L2. The present invention is not limited to this If desired, a target vehicle-to-vehicle distance L* is determined by calculating a product of vehicle speed Vm and time that is required to reduce a distance from a preceding vehicle. Using the distance L* as a target, ADR may be carried out to reduce a deviation of an actual distance L from L* toward zero.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-043397, filed Feb. 21, 2000, the disclosure of which is hereby incorporated by reference in its entirety.

What is claimed is:

1. A system for reducing speed of a vehicle, comprising:
   a braking device coupled to at least one wheel of the vehicle for applying a braking torque to the at least one wheel in response to a braking signal; and
   a controller having a control logic for determining whether or not there is a need for operator braking action, determining a stand-by braking torque when there is a need for operator braking action, determining a transition braking torque based on the stand-by braking torque and an automatic distance regulation (ADR) braking torque, and generating a braking signal for the braking device to apply the transition braking torque to at least one wheel of the vehicle.

2. The system as claimed in claim 1, wherein the ADR braking torque is represented by an ADR braking torque request that is generated when an actual distance from a preceding vehicle in front becomes less than a set desired distance.

3. The system as claimed in claim 1, wherein the step of determining a transition braking torque includes:
   selecting a higher one of the stand-by braking torque and the ADR braking torque.

4. The system as claimed in claim 3, wherein the step of determining whether or not there is a need for operator braking action includes:
   determining an actual distance from obstacle located in the direction of the vehicle;
   determining an actual vehicle speed;
   determining a brake pedal position;
   determining an accelerator pedal position; and
   making the determination whether or not there is a need for operator braking action based on the actual distance, the actual vehicle speed, the brake pedal position, and the accelerator pedal position.

5. The system as claimed in claim 4, wherein the step of determining whether or not there is a need for operator braking action includes:
   calculating a target deceleration based on the actual vehicle speed, and the actual distance;
   comparing the target deceleration to a predetermined deceleration value;
   comparing the accelerator pedal position to a predetermined accelerator pedal position value; and
   making the determination that there is a need for braking when the target deceleration exceeds the predetermined deceleration value, the brake pedal is released, and the accelerator pedal position is less than the predetermined accelerator pedal position value.

6. The system as claimed in claim 5, wherein said predetermined accelerator pedal position value corresponds to a position at which the vehicle starts acceleration upon depressing the accelerator pedal.

7. The system as claimed in claim 1, wherein the step of determining a transition braking torque includes:
   holding the transition braking torque as high as the stand-by braking torque for a predetermined period of time since the determination was made that there was a need for operator braking action;
   comparing the stand-by braking toque to the ADR braking torque upon elapse of the predetermined period of time;
   holding the transition braking torque as high as the stand-by braking torque over extended period of time after elapse of the predetermined period of time when said ADR braking torque is less than the stand-by braking torque upon elapse of the predetermined period of time.

8. The system as claimed in claim 7, wherein the step of determining whether or not there is a need for operator braking action includes:
   determining an actual distance from obstacle located in the direction of the vehicle;
   determining an actual vehicle speed;
   determining a brake pedal position;
   determining an accelerator pedal position; and
   making the determination whether or not there is a need for operator braking action based on the actual vehicle speed, the actual distance, the brake pedal position, and the accelerator pedal position.

9. The system as claimed in claim 8, wherein the step of determining whether or not there is a need for operator braking action includes:
   calculating a target deceleration based on the actual vehicle speed, and the actual distance;
   comparing the target deceleration to a predetermined deceleration value;
   comparing the accelerator pedal position to a predetermined accelerator pedal position value; and
   making the determination that there is a need for operator braking action when the target deceleration exceeds the predetermined deceleration value, the brake pedal is released, and the accelerator pedal position is less than the predetermined accelerator pedal position value.

10. The system as claimed in claim 7, wherein the stand-by braking torque is invariable.

11. The system as claimed in claim 7, wherein the stand-by braking torque decreases at a predetermined rate since the determination was made that there was a need for operator braking action.

12. The system as claimed in claim 7, wherein the stand-by braking torque decreases at a first predetermined rate for the predetermined time since the determination was made that there was a need for operator braking action, and at a second predetermined rate that is greater than the first predetermined rate after elapse of the predetermined period of time.

13. The system as claimed in claim 7 wherein the extended period of time ends when the ADR braking torque becomes less than a predetermined braking torque value.

14. The system as claimed in claim 7, wherein the extended period of time continues as long as the ADR braking torque is reducing until the ADR braking torque becomes less than a predetermined braking torque value.

15. A method for reducing speed of a vehicle, comprising:
   determining whether or not there is a need for operator braking action;
   determining a stand-by braking torque when there is a need for operator braking action;
   determining a transition braking torque based on the stand-by braking torque and an automatic distance regulation (ADR) braking torque; and
   applying the transition braking torque to at least one wheel of the vehicle.

16. The method as claimed in claim 15, wherein the ADR braking torque is represented by an ADR braking torque request that is generated when an actual distance from a preceding vehicle in front becomes less than a set desired distance.

17. The method as claimed in claim 16, wherein the step of determining a transition braking torque includes:
   holding the transition braking torque as high as the stand-by braking torque for a predetermined period of time since the determination was made that there was a need for operator braking action;
   comparing the stand-by braking toque to the ADR braking torque upon elapse of the predetermined period of time;
   holding the transition braking torque as high as the stand-by braking torque over extended period of time after elapse of the predetermined period of time when the ADR braking torque is less than the stand-by braking torque upon elapse of the predetermined period of time until the ADR braking torque exceeds the stand-by braking torque.

18. The method as claimed in claim 17, wherein the step of determining a transition braking torque further includes:
   holding the transition braking torque as high as the ADR braking torque when the ADR braking torque exceeds the stand-by braking torque during the extended period of time.

19. A computer readable storage medium having stored data representing instructions readable by a computer to reduce speed of a vehicle, the computer readable storage medium comprising:
   instructions for determining whether or not there is a need for operator braking action;
   instructions for determining a stand-by braking torque when there is a need for operator braking action;
   instructions for determining a transition braking torque based on the stand-by braking torque and an automatic distance regulation (ADR) braking torque; and
   instructions for applying the transition braking torque to at least one wheel of the vehicle.

20. The computer readable storage medium as claimed in claim 19, wherein the instructions for determining a transition braking torque includes:
   instructions for holding the transition braking torque as high as the stand-by braking torque for a predetermined period of time since the determination was made that there was a need for operator braking action;
   instructions for comparing the stand-by braking toque to the ADR braking torque upon elapse of the predetermined period of time; and
   instructions for holding the transition braking torque as high as the stand-by braking torque over extended period of time after elapse of the predetermined period of time when the ADR braking torque is less than the stand-by braking torque upon elapse of the predetermined period of time until the ADR braking torque exceeds the stand-by braking torque.

21. A system for reducing speed of a vehicle, comprising:
   means for applying a braking torque to at least one wheel of the vehicle in response to a braking signal; and
   controller means for determining whether or not there is a need for operator braking action, determining a stand-by braking torque when there is a need for operator braking action, determining a transition braking torque based on the stand-by braking torque and an automatic distance regulation (ADR) braking torque, and generating a braking signal for the braking device to apply the transition braking torque to at least one wheel of the vehicle.

* * * * *